Dec. 8, 1959   C. I. H. NICHOLL   2,916,360
DISTRIBUTION DEVICE
Filed July 6, 1956   3 Sheets-Sheet 1

Dec. 8, 1959  C. I. H. NICHOLL  2,916,360
DISTRIBUTION DEVICE

Filed July 6, 1956  3 Sheets-Sheet 2

Inventor
Christopher Lloyd Hubert Nicholl
by Stevens, Davis, Miller & Mosher
his attorneys Dec. 8, 1959 C. I. H. NICHOLL 2,916,360
DISTRIBUTION DEVICE
Filed July 6, 1956 3 Sheets-Sheet 3
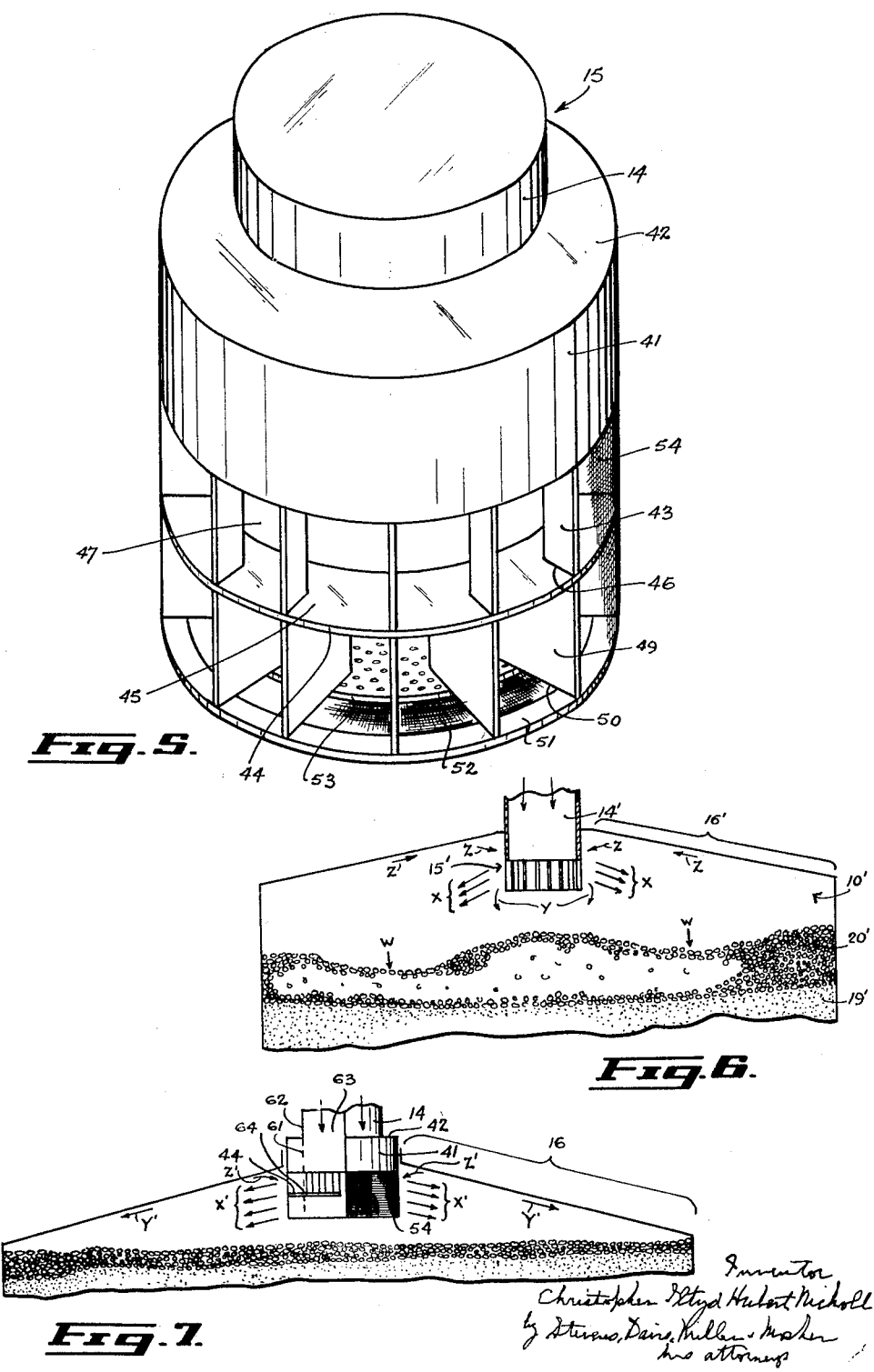

United States Patent Office
2,916,360
Patented Dec. 8, 1959

2,916,360

DISTRIBUTION DEVICE

Christopher Iltyd Hubert Nicholl, Eastview, Ontario, Canada, assignor to Polymer Corporation Limited, Sarnia, Ontario, Canada, a corporation of Canada Application July 6, 1956, Serial No. 596,264

4 Claims. (Cl. 23—288)

This invention relates to fluid distribution means. It relates generally to a system in which a stream of fluid at a relatively high velocity and of a relatively small cross-section is passed through a distributor whereby it is converted to a stream of fluid at a relatively low velocity and of a larger cross-section, and in which the fluid then impinges upon a bed of mechanically weak contact material. While such conversion occurs in many catalytic processes, ion exchange processes and drying processes common in the chemical industry, a special need has arisen in the system in which the fluid consists of a mixture of n-butylene and steam which is to be passed through a catalyst to dehydrogenate the n-butylene to butadiene-1,3.

It is now well known to dehydrogenate n-butylene to butadiene-1,3 in the presence of steam, in the presence of a catalyst the active ingredient of which is calcium nickel phosphate, and at a temperature of 950–1350° F. One example of a suitable catalyst is the one disclosed and claimed in United States Patent No. 2,442,320, issued May 25, 1948, to Andrew J. Dietzler et al. Such catalyst is normally used in the form of pellets which are mechanically relatively weak.

It has already been appreciated that the hydrocarbon should have a short residence time at the reaction temperature prior to passage through the catalyst in order to avoid undue destructive decomposition of the hydrocarbon. The residence time of the hydrocarbon prior to its passage through the catalyst has been minimized for example by thermocompressors, as in United States Patent No. 2,399,560, issued April 30, 1946, to E. V. Murphree.

In an alternative method, proposed by the present applicant to shorten such residence time, a mixture of steam and hydrocarbon is admitted to the reactor at a relatively high velocity through an inlet means which may conveniently be a central pipe. However, since the catalyst is mechanically weak, the high velocity gases would tend to pulverize the catalyst. It has been found that such pulverized catalyst causes an undesirably high pressure drop through the bed. Hence, means have been sought whereby to transform the gaseous stream from one of high velocity and small cross-section to one of low velocity and larger cross-section while such gaseous stream is passing through a short distance.

It was attempted to solve such problem by affixing to the end of the gas inlet means a flow distributor which diffused the small diameter high velocity stream, in a very short distance, to a low velocity stream of larger diameter. A flow distributor was used which consisted merely of a primary annular deflecting plate downstream of the inlet means which served to force the single gaseous stream partially to leave the distributor through a plurality of apertures in the wall thereof above said deflecting plate and partially to leave through a perforated secondary base plate, downstream from the primary plate and substantially parallel thereto, which served to break up further the stream emerging from the primary plate by forcing it to exit through apertures in the wall of the distributor between the primary plate and secondary base plate and through the perforations in the secondary base plate.

It was generally the practice to retain the catalyst bed in position by means of a hold-down screen with a layer of inert material, usually Raschig rings disposed between the catalyst and the screen. The screen usually was not unitary but consisted of a plurality of relatively narrow strips of screen material, held together by means of connecting wires to form a screen covering the entire surface of the bed. It was found that with the flow distributor described hereinabove, there was still a tendency for the hold-down screen to be disrupted during the course of the contacting operation, such disruption resulting from a breakage of the connecting wires. Such movement of the screen resulted in agitation and undesirable pulverization of the mechanically weak catalyst. Pulverized catalyst is generally unsatisfactory since, firstly, some catalysts are chemically unsuitable for use when in powdered form; secondly, the powder tends to clog the interstices in the bed and results in a dangerous pressure build-up within the reactor, and thirdly, because such disruption appears to be indicative of a back flow of reactants which represents an undesirable increase in the residence time of the reactants above the bed.

One suitable manner of avoiding such disruption of the contact bed during the contacting operation involves enclosing the distributor in a cylindrical wire mesh basket. While such basket is satisfactory under normal operating conditions, it has been found that, at very high gaseous reactant inlet velocities, further difficulties resulted. It was found that an annular depression was formed in the contact material, indicative of bed disruption which has been indicated above to be unsatisfactory.

It is an object, therefore, of the present invention to disclose a distributor which converts a stream of fluid from one of a relatively high velocity and relatively small cross-section to one of relatively low velocity and larger cross-section.

It is a further object of the present invention to disclose a distributor which satisfactorily permits the passage of gaseous reactants through a bed of mechanically weak contact material with the residence time at the reaction temperature prior to entering the catalyst bed kept as short as possible.

These and other objects of the present invention are achieved in a distributor for use in a reaction vessel consisting of a shell containing a static bed of contact material and equipped with inlet and outlet means and desirably though not necessarily comprising also a funnel, such funnel comprising a downcomer attached to the inlet means and a frusto-conical hood depending from said downcomer and resting upon the periphery of said bed, said distributor being adapted to be connected to the discharge end of said inlet means (usually a downcomer) and comprising first annular plate means positioned to deflect fluid discharged from the peripheral area of the discharge end of said inlet means onto second annular plate means extending outwardly beyond an imaginary continuation of the surface of such discharge end and a plate downstream of said first plate means positioned for deflecting fluid discharged from the central area of the discharge end of said inlet means. In a suitable form of the invention, hereinabove mentioned first annular plate means and the second annular plate means consist of a single primary annular deflecting plate coaxial with the longitudinal axis of said inlet means, the plane of said plate lying generally transverse and preferably exactly perpendicular to said axis downstream of the discharge end of said inlet means to project inwardly into the path of fluid discharged from a peripheral area of said discharge end and to project outwardly beyond an imaginary continuation of the surface of such discharge end. It is desirable that such plate project outwardly beyond an imaginary continuation of the discharge end of said inlet means by an amount at least of the order of the distance said plate is spaced from the mouth of said discharge end.

One modification of the present invention resides in locating a plurality of circumferentially spaced partitions, either between the primary plate and the secondary plate or between the mouth of the downcomer and the secondary plate, or both, such partitions extending radially a distance dependent upon their position. If they are located between the primary and secondary plates, they usually extend radially from the inner periphery of the primary plate to the outer periphery of the secondary plate; if they are located between the mouth of the inlet means and the primary plate they extend radially from the periphery of the inlet means to the outer periphery of the primary plate.

A further modification of the present invention involves the enclosing of the deflecting plates with a perforated envelope, preferably, a cylindrical wire mesh envelope. The bottom of such cylindrical envelope is usually connected to the secondary plate. Such secondary plate may be either perforated or imperforate.

The invention will now be described with reference to the drawings, in which

Fig. 5 is a perspective view, partly broken away, of the embodiment shown in Figs. 1–4;

Fig. 6 is a schematic central vertical sectional elevation of a distribution system heretofore used, showing the fluid flow between a fixed hood and the catalyst bed; and Fig. 7 is a schematic central vertical elevation, partly in section of a distribution system according to one embodiment of the present invention, showing the fluid flow between a movable hood and the catalyst bed.

Figure 1:
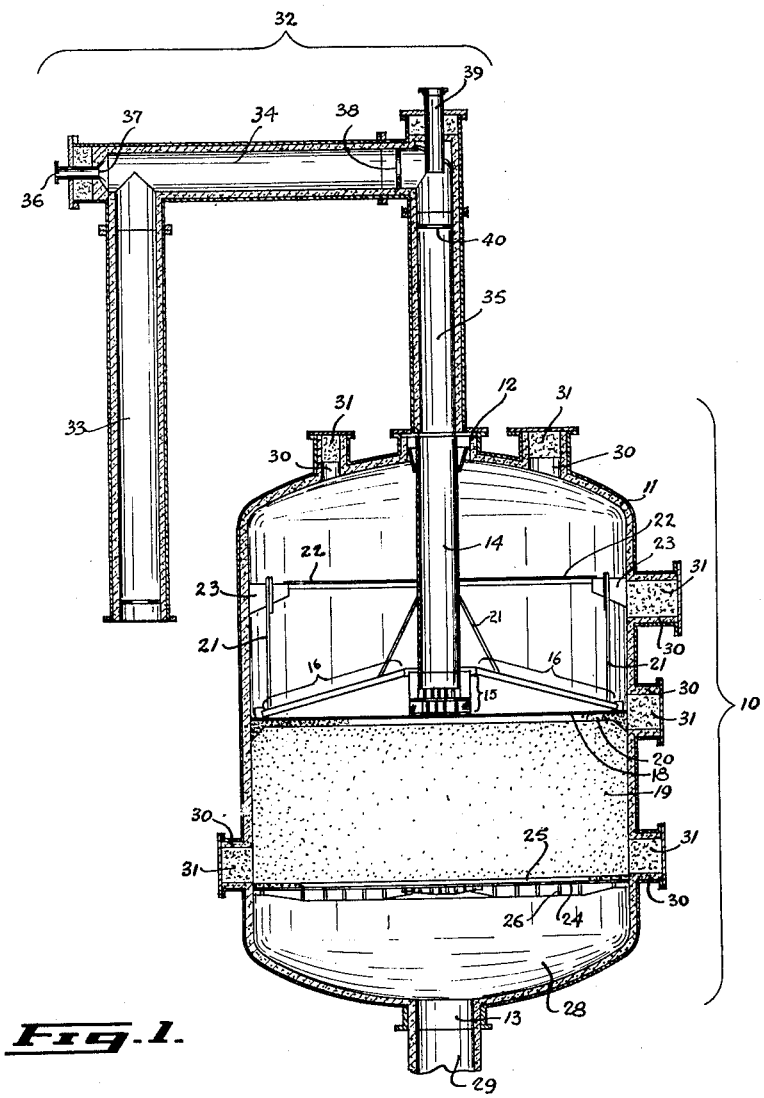
Fig. 1 is a section of the reaction vessel showing a gas injection system, a hood, and an embodiment of the novel distributor of the present invention.
Figure 2:
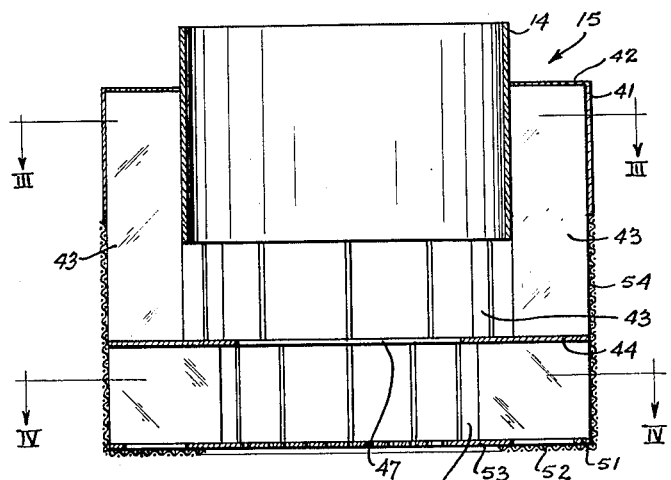
Fig. 2 is a central vertical sectional elevation along the line 2—2 of Figs. 3 and 4 of the embodiment of the invention shown generally in Fig. 1.
Figure 3:
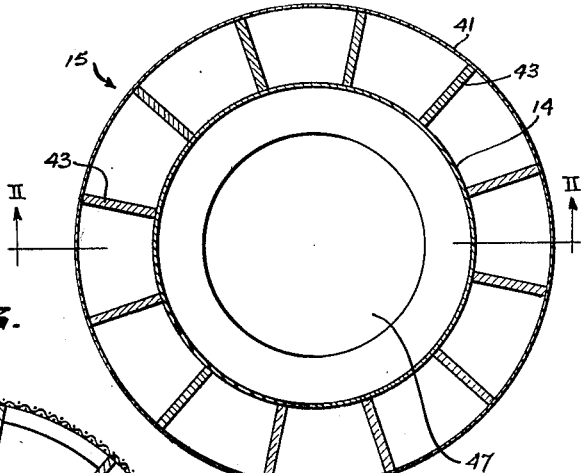
Fig. 3 is a section along line 3—3 of Fig. 2.
Figure 4:
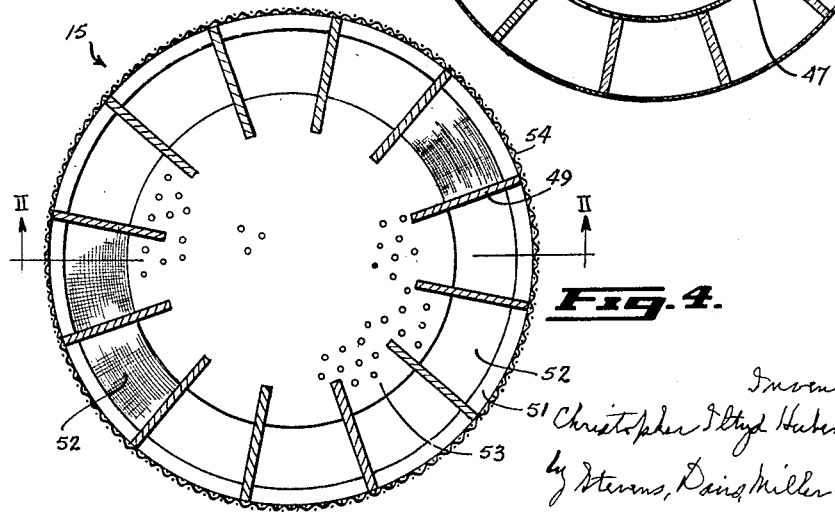
Fig. 4 is a section along line 4—4 of Fig. 2.

The reaction vessel associated with the distributor of the present invention is shown in Fig. 1. The reaction vessel itself is designated generally as 10 and consists of an insulated shell 11 equipped with manways 30 each fitted with an insulating plug 31. Attached to inlet pipe 35 through the inlet port 12 is downcomer 14.

The inlet system is designated generally by numeral 32. That system allows any two or all three of three different fluids to be intimately mixed prior to admission to the reaction vessel through the distributor of the present invention. In one particular case, that of the dehydrogenation of n-butylene to butadiene-1,3 in the presence of a calcium nickel phosphate-chromium oxide catalyst, the reaction is a cyclic one. During one phase of one cycle, a mixture of n-butylene and steam is passed through the catalyst in order to dehydrogenate the n-butylene to butadiene-1,3. During the other phase of the same cycle, a mixture of steam and air is passed through the catalyst in order to burn off deposited coke, and so to regenerate the catalyst. The system consists of steam pipe 33, connecting pipe 34 and inlet pipe 35. The connecting pipe 34 has an air inlet pipe 36 with its port 37, and an orifice 38. The inlet pipe 35 has a hydrocarbon inlet pipe 39 and an orifice 40.

The operation of the inlet system during dehydrogenation is as follows: steam passes along pipe 33, through pipe 34 and through orifice 38 where it is intimately mixed with hydrocarbon entering pipe 35 from pipe 39. The mixture is further mixed during passage through orifice 40, and is then passed into downcomer 14.

During regeneration the inlet system operates as follows: steam passes along pipe 33 and is intimately mixed with air which enters pipe 34 from pipe 36 through port 37. The mixture is further mixed by passage through orifices 38 and 40 and is then passed into downcomer 14.

Downcomer 14 terminates in the distributor of the present invention, shown generally as 15 and surrounded by a hood designated generally as 16. Hood 16 rests upon hold-down screen 18, which is separated from the bed of contact material 19 by an inert material 20, which may suitably be Raschig rings. Since the hood 16 rests indirectly on the bed of contact material, the hood is raised and lowered as the contact material expands and contracts. In order to prevent the hood from becoming distorted or displaced as it is raised and lowered, hairpin shaped braces 21 are provided at the desired downward limit of travel of the hood to engage radially extending brackets 23, such braces being hinged to the hood. Brackets 23 also carry ring 22.

The bed of contact material rests on a layer of inert material 25 which may conveniently be Berl saddles. Such material is supported by a screen 24 which rests on a grate 26. The fluid material leaves the vessel through such grate, space 28, outlet port 13 and thence to outlet pipe 29.

One embodiment of the present invention is shown in greater detail in Figs. 2, 3, 4 and 5. The distributor consists of a cylindrical shell 41 with an annular cover 42 integral therewith, concentric with downcomer 14 and spaced therefrom by radiating, circumferentially spaced reinforcing partitions 43. Below the downcomer 14 and concentric therewith is annular deflecting plate 44, whose upper surface 45 is in abutting relationship to the lower surfaces 46 of the partitions 43. The deflecting plate 44 defines a central aperture 47 which lies below the open bottom of the downcomer but which is of smaller diameter.

Depending from the lower surface of plate 44 is a series of circumferentially spaced, radial, reinforcing partitions 49. Abutting the lower portions 50 of partitions 49 is a flat, bottom ring 51, an annular wire mesh screen 52 concentric therewith and having an outer diameter substantially equal to the inner diameter of ring 51, and, concentric with both the ring 51 and the screen 52, a perforated bottom deflecting plate 53 whose diameter is substantially equal to the inner diameter of screen 52. Enclosing the open cylindrical wall of the distributor is wire mesh screen envelope 54.

While it is not desired to limit the operation of the distributor of the present invention to any particular theory, it is believed that the faults of the prior distributors were due to the fact that streams of high velocity gas escaped radially and downwardly from the distributor. Such undesirable flow of gas is shown diagrammatically in Fig. 6. In Fig. 6, the reactor, designated generally as 10' contains a bed of Raschig rings 20' resting on a bed of catalyst 19'. The gases flow through downcomer 14' and are distributed through distributor 15'. The fixed hood is shown generally as 16'. It is seen that there is a substantial flow of gas, designated generally as X directed conically downwardly and outwardly towards the catalyst bed at a relatively high velocity. A further generally downwardly directed flow of relatively high velocity gas is designated as Y. The impinging of high velocity gaseous streams on the surface of the bed 20' results in the formation of an annular depression W, with the attendant undesirable effects as mentioned hereinabove. For clarity, the hold-down screen which usually rests on the bed of Raschig rings has not been shown, but this diagrammatic representation serves to show the deleterious effects of the high velocity downwardly directed gases. Also not shown are the streams of downwardly directed gases passing through the perforated bottom plate. It is further seen that there is an undesirable back flow, designated generally as Z, which indicates that the residence time of the gas is increased.

The flow of gases using the distributor of the present invention is shown diagrammatically in Fig. 7, in which the reference numerals used are the same as those used in Figs. 1–5. The high velocity downwardly direc'ed gas is seen to be deflected off the deflecting plate 44, which extends outwardly beyond an imaginary continuation 61 of the surface 62 of the discharge end 63 of the downcomer 14, and is thus directed downwardly to follow a path X' which allows it to impinge upon the inner surface of the hood 16, and subsequently to follow path Y' downwardly to the catalyst bed. It is seen that the degree of such deflection is dependent on the vertical spacing of the deflecting plate 44 from the discharge end 63 of the downcomer 14, as well as by the extent which the deflecting plate 44 extends beyond point 64, which represents the point at which the imaginary continuation 61 intersects deflecting plate 44. Thus, the surface of the catalyst bed is not bombarded by high speed radial, downwardly directed gas but is contacted with relatively low velocity gas which deflects off plates 44 and 53 and hood 16 at the peripheral area and by gas passing through perforated plate 53 at the central area. There also may be only minor amounts of back flow of the gas, shown as Z'.

In the embodiment described the distributor contains one impervious annular deflecting plate 44 extending outwardly to a wire mesh envelope, such plate being interposed between the downcomer and the bottom perforated plate. It is, of course, possible to employ variants of this embodiment. For example, there may be more than one annular deflecting plate between the downcomer and the bottom plate. Furthermore, while the annular plate has been shown to be substantially horizontal when the downcomer is vertical, it is possible for the plate to be inclined from the horizontal either in an upward or downward direction, provided, of course, the plate deflects sufficient high velocity radially directed gas so that the surface of the catalyst bed is relatively undisturbed.

What I claim is:

1. In a reaction vessel for the catalytic dehydrogenation of a gaseous stream of olefinic hydrocarbons, said hydrocarbons containing at least 4 carbon atoms in the olefinic chain, said vessel consisting essentially of a shell adapted to contain a static bed of catalyst, an inlet means and outlet means; the combination with said inlet means, of a distribution device designed to convert a high velocity stream of said gaseous olefinic hydrocarbons having a small cross-sectional area to one of low velocity and large cross-sectional area within a short distance, by a structure comprising: a first deflecting plate coaxial with the longitudinal axis of said inlet means, said first plate being annular, the plane of said plate lying generally transverse to said axis downstream of the discharge end of said inlet means, said annular deflecting plate projecting inwardly into the path of gas discharged from a peripheral area of the discharge end of said inlet means, and to project outwardly beyond an imaginary continuation of the surface of such discharge end by an amount at least equal to the distance the plate is spaced from the discharge end of the inlet means, said first deflecting plate deflecting only that axially moving gas discharged from the peripheral area of the downcomer and converting said deflected gas to a radially moving stream; a second deflecting plate coaxial with and parallel to the first deflecting plate, the second plate being imperforate and being positioned to deflect the gas passing through the opening in said first deflecting plate, and to convert said axially moving stream of gas to a radially outwardly moving stream of gas the first deflecting plate and the second deflecting plate being positioned in the distribution device and being spaced from each other and from the discharge end of the inlet means by means of a series of circumferentially spaced partitions positioned to extend radially outward from an imaginary extension of the longitudinal axis of the inlet means; and a cylindrical perforated envelope coaxial with and surrounding the outlet of the inlet means, the first deflecting plate and the second deflecting plate whereby the original axially flowing gas is converted entirely to streams of radially flowing gas whose cross-sectional area is greater than that of the original gas stream.

2. In a reaction vessel for the catalytic dehydrogenation of a gaseous stream of olefinic hydrocarbons, said hydrocarbons containing at least 4 carbon atoms in the olefinic chain, said vessel consisting essentially of a shell adapted to contain a static bed of catalyst, an inlet means and outlet means, the combination, with said inlet means, of a distribution device designed to convert a high velocity stream of said gaseous olefinic hydrocarbons having a small cross-sectional area to one of low velocity and large cross-sectional area within a short distance, by a structure comprising: a first deflecting plate coaxial with the longitudinal axis of said inlet means, said first plate being annular, the plane of said plate lying generally transverse to said axis downstream of the discharge end of said inlet means, said annular deflecting plate projecting inwardly into the path of gas discharged from a peripheral area of the discharge end of said inlet means, and projecting outwardly beyond an imaginary continuation of the surface of the discharge end of said inlet means by an amount at least equal to the distance the plate is spaced from the discharge end of the inlet means, said first deflecting plate deflecting only that axially moving gas discharged from the peripheral area of the downcomer and converting said deflected gas to a radially moving stream; a second deflecting plate coaxial with and parallel to the first deflecting plate, the second plate being perforated and being positioned to deflect the gas passing through the opening in said first deflecting plate, and to convert said axially moving stream of gas to a radially outwardly moving stream of gas, the first deflecting plate and the second deflecting plate being positioned in the distribution device and being spaced from each other and from the discharge end of the inlet means by means of a series of circumferentially spaced partitions, positioned to extend radially outward from an imaginary extension of a longitudinal axis of the end means; and a cylindrical perforated envelope coaxial with and surrounding the outlet of the inlet means, the first deflecting plate and the second deflecting plate whereby the original axially flowing gas is converted entirely into streams of radially flowing gas whose cross-sectional area is greater than that of the original gas stream.

3. The distribution device as claimed in claim 1 wherein the perforated envelope is a wire mesh.

4. The distribution device as claimed in claim 2, wherein the perforated envelope is a wire mesh.

References Cited in the file of this patent

UNITED STATES PATENTS

| | | |
|---|---|---|
| 1,877,046 | Phillips | Sept. 13, 1932 |
| 1,995,400 | Shultz | Mar. 26, 1935 |
| 2,399,560 | Murphree | Apr. 30, 1946 |
| 2,483,948 | Underwood | Oct. 4, 1949 |
| 2,767,066 | Zimmerman | Oct. 16, 1956 |

FOREIGN PATENTS

| | | |
|---|---|---|
| 492,731 | France | Apr. 1, 1919 |